(12) United States Patent
Cho et al.

(10) Patent No.: US 10,589,708 B2
(45) Date of Patent: Mar. 17, 2020

(54) VEHICLE AIRBAG SYSTEM

(71) Applicant: Ford Global Technologies, LLC, Dearborn, MI (US)

(72) Inventors: Jaeho Cho, Southfield, MI (US); Robert W. McCoy, Ann Arbor, MI (US); Mangala Ambalangodage Jayasuriya, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 138 days.

(21) Appl. No.: 15/871,350

(22) Filed: Jan. 15, 2018

(65) Prior Publication Data
US 2019/0217804 A1 Jul. 18, 2019

(51) Int. Cl.
| | |
|---|---|
| *B60R 21/232* | (2011.01) |
| *B60R 21/0136* | (2006.01) |
| *B60R 21/214* | (2011.01) |
| *B60R 21/233* | (2006.01) |
| *B60R 21/2338* | (2011.01) |
| *B60R 21/01* | (2006.01) |
| *B60R 21/231* | (2011.01) |

(52) U.S. Cl.
CPC ........ *B60R 21/232* (2013.01); *B60R 21/0136* (2013.01); *B60R 21/214* (2013.01); *B60R 21/233* (2013.01); *B60R 21/2338* (2013.01); *B60R 2021/01211* (2013.01); *B60R 2021/23153* (2013.01); *B60R 2021/23161* (2013.01); *B60R 2021/23192* (2013.01); *B60R 2021/23308* (2013.01); *B60R 2021/23324* (2013.01); *B60R 2021/23386* (2013.01)

(58) Field of Classification Search
CPC . B60R 21/232; B60R 21/0136; B60R 21/214; B60R 21/233; B60R 21/2338; B60R 2021/23192; B60R 2021/23308; B60R 2021/01211; B60R 2021/23161; B60R 2021/23386; B60R 2021/23153
See application file for complete search history.

(56) References Cited

U.S. PATENT DOCUMENTS

| | | | |
|---|---|---|---|
| 6,722,691 B1* | 4/2004 | Håland | B60R 21/16 280/730.1 |
| 7,918,480 B2 | 4/2011 | Kwon et al. | |
| 7,926,840 B1 | 4/2011 | Choi | |
| (Continued) | | | |

FOREIGN PATENT DOCUMENTS

| | | |
|---|---|---|
| DE | 10039800 A1 | 2/2002 |
| JP | 6156279 B2 | 6/2017 |

OTHER PUBLICATIONS

Motoring article entitled "Autonomous car airbags resemble witchetty grubs," dated Jun. 14, 2017, Accessed Oct. 27, 2017 https://www.motoring.com.au/autonomous-car-airbags-resemble-witchetty-grubs-107591/.

*Primary Examiner* — Drew J Brown
(74) *Attorney, Agent, or Firm* — Frank A. MacKenzie; Bejin Bieneman, PLC (57) ABSTRACT

An assembly includes a seat. The assembly includes a housing. The assembly includes an airbag inflatable to an inflated position having a first inflatable leg and a second inflatable leg extending from the housing, and an inflatable member extending from the first inflatable leg to the second inflatable leg. The assembly includes a tether having a first end fixed to the first inflatable leg and a second end spaced from the first end and the airbag.

20 Claims, 8 Drawing Sheets

(56) References Cited

U.S. PATENT DOCUMENTS

| | | |
|---|---|---|
| 8,807,593 B2 | 8/2014 | Lee et al. |
| 9,725,064 B1 | 8/2017 | Faruque et al. |
| 9,789,840 B2 | 10/2017 | Farooq et al. |
| 2012/0133114 A1* | 5/2012 | Choi .................... B60R 21/214 |
| | | 280/728.2 |
| 2017/0113646 A1* | 4/2017 | Lee ..................... B60R 21/2338 |
| 2017/0129442 A1 | 5/2017 | Choi |
| 2018/0229681 A1* | 8/2018 | Jaradi ................... B60R 21/264 |
| 2018/0272985 A1* | 9/2018 | Nagasawa ............. B60R 21/232 |
| 2019/0106073 A1* | 4/2019 | Sundararajan ........ B60R 21/214 |
| 2019/0161048 A1* | 5/2019 | Thomas ................ B60R 21/216 |
| 2019/0161049 A1* | 5/2019 | Thomas ................ B60R 21/215 |
| 2019/0202391 A1* | 7/2019 | Cho ..................... B60R 21/214 |

* cited by examiner

VEHICLE AIRBAG SYSTEM

BACKGROUND

A vehicle may include one or more airbags deployable during vehicle impacts to absorb energy from occupants of the vehicle during the impact. The airbag may be a component of an airbag assembly including a housing supporting the airbag, and an inflation device in communication with the airbag for inflating the airbag from an uninflated position to an inflated position.

DETAILED DESCRIPTION

An assembly includes a seat. The assembly includes a housing. The assembly includes an airbag inflatable to an inflated position having a first inflatable leg and a second inflatable leg extending from the housing, and an inflatable member extending from the first inflatable leg to the second inflatable leg. The assembly includes a tether having a first end fixed to the first inflatable leg and a second end spaced from the first end and the airbag.

The inflatable member may be elongated upward and away from the seat when the airbag is in the inflated position.

The seat may be rear-facing.

The second end of the tether may be behind the seat.

The assembly may include a vehicle roof, the housing supported by the roof, and the second end of the tether fixed to the vehicle roof.

The assembly may include a vehicle roof, the inflatable member spaced from the vehicle roof when the airbag is in the inflated position.

The seat may include a seat back defining a midpoint, the first and second inflatable legs extending below the midpoint when the airbag is in the inflated position.

The assembly may include a processor and a memory storing instructions executable by the processor to actuate the airbag in response to detecting a vehicle rear impact.

The assembly may include a second seat, the first seat and the second seat positioned to face each other. The assembly may include a second housing. The assembly may include a second airbag inflatable to an inflated position having a first inflatable leg and a second inflatable leg extending from the housing, and an inflatable member extending from the first inflatable leg to the inflatable second leg. The assembly may include a second tether having a first end fixed to the first inflatable leg of the second airbag and a second end spaced from the first end of the tether and the second airbag.

The assembly may include a processor and a memory storing instructions executable by the processor to actuate the airbag and to refrain from actuating the second airbag upon detecting a vehicle impact.

An assembly includes a housing. The assembly may include an airbag inflatable to an inflated position having a first inflatable leg and a second inflatable leg extending from the housing and along a longitudinal axis, and an inflatable member extending from the first inflatable leg to the second inflatable leg along a lateral axis. The assembly may include a tether having a first end fixed to the first inflatable leg and a second end spaced from the first end and the airbag.

The first inflatable leg may have a first end and a second end spaced from the first end along the longitudinal axis, and a first length at the first end and a second length at the second end that is greater than the first length, when the airbag is in the inflated position.

The assembly may include a second tether external of the airbag and having a first end fixed to the first inflatable leg and a second end spaced from the first end and the airbag along the longitudinal axis.

The first end of the tether may be spaced from the first end of the second tether along a vertical axis.

The first end of the tether may be spaced from the first end of the second tether along the longitudinal axis.

The second end of the tether and the second end of the second tether may be fixed at a same location.

The inflatable member may be arcuate when the airbag is in the inflated position.

The first inflatable leg may include an inner panel and an outer panel spaced from the inner panel along the lateral axis, and a plurality of panels extending from the inner panel to the outer panel within the airbag.

The inflatable member may include a front panel and a rear panel spaced from the front panel along the longitudinal axis and a plurality of panels extending from the front panel to the rear panel within the airbag.

The first inflatable leg may include a plurality of panels internal of the airbag and extending to distal edges, the distal edges spaced from each other and free of attachment to other panels.

With reference to the Figures, wherein like numerals indicate like parts throughout the several views, an airbag assembly 20 for restraining an occupant of a seat 22f, 22r of a vehicle 24 includes a housing 26 and an airbag 28 supported by the housing 26. The airbag 28 is inflatable to an inflated position having a first inflatable leg 30 and a second inflatable leg 32 extending from the housing 26, and an inflatable member 34 extending from the first inflatable leg 30 to the second inflatable leg 32. The airbag assembly 20 includes a tether 36 having a first end 38 fixed to the first inflatable leg 30 and a second end 40 spaced from the first end 38 and the airbag 28.

The airbag 28 in the inflated position restrains movement of the occupant, e.g., during a vehicle impact. The tether 36 supports the airbag 28 in the inflated position such that a reaction surface, e.g., of a seat, an instrument panel, a door, etc., behind the airbag 28 is not necessary for providing such restraint.

The vehicle 24, shown in FIGS. 1-6, may be any passenger or commercial automobile such as a car, a truck, a sport utility vehicle, a crossover vehicle, a van, a minivan, a taxi, a bus, etc. The vehicle 24 may include one or more seats 22f, 22r, a roof 42, one or more airbag assemblies 20, etc. The vehicle 24 defines a longitudinal axis A1, i.e., extending between a front and a rear of the vehicle 24. The vehicle 24 defines a lateral axis A2, i.e., extending between a left side and a right side of the vehicle 24, i.e., in a cross-vehicle direction. The vehicle 24 defines a vertical axis A3, i.e., extending between a top and a bottom of the vehicle 24. The longitudinal axis A1, the lateral axis A2, and the vertical axis A3 may all be perpendicular to each other. The directions front, rear, left, right, top, and bottom are all relative to an orientation of an operator of the vehicle 24, an orientation of controls for operating the vehicle 24, e.g., an instrument panel, etc., a forward driving direction when wheels of the vehicle 24 are all parallel with each other, etc.

The vehicle 24 may include a body and a frame. The body and frame may be of a unibody construction. In the unibody construction, the body, e.g., rockers, pillars, the roof 42, a floor, etc., serve as the vehicle frame. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, carbon fiber, etc.

The roof 42 provides cover for occupants for the vehicle 24. The roof 42 may include an internal panel, an exterior panel, and a headliner 44. The internal panel provides support to the exterior panel, the headliner 44, etc. The internal panel may be made of steel, aluminum, carbon fiber, or any other suitable material. The headliner 44 and the exterior panel provide class-A surfaces to the roof 42, i.e., surfaces specifically manufactured to have a high-quality, finished aesthetic appearance free of blemishes, etc.

The headliner 44 may include one or more tear seams 46. The tear seams 46 are designed to rupture upon inflation of the airbag 28. The tear seams 46 may be weaker than a portion of the headliner 44 adjacent the tear seams 46, e.g., the tear seams 46 may be thinner, made of a weaker material, etc. The tear seams 46 may connect panels of the headliner 44s, e.g., with breakaway stitches. The tear seams 46 may extend along the longitudinal axis A1.

The seats 22f, 22r, shown in FIGS. 2-6, are bucket seats, but alternatively the seats 22f, 22r may be bench seats or another type of seats.

Each of the seats 22f, 22r may include a seat back 48, a seat bottom 50, and a headrest 52. The headrest 52 may be supported by the seat back 48 and may be stationary or movable relative to the seat back 48. The seat back 48 may be supported by the seat bottom 50 and may be stationary or movable relative to the seat bottom 50. The seat back 48, the seat bottom 50, and/or the headrest 52 may be adjustable in multiple degrees of freedom. Specifically, the seat back 48, the seat bottom 50, and/or the headrest 52 may themselves be adjustable, in other words, adjustable components within the seat back 48, the seat bottom 50, and/or the headrest 52, and/or may be adjustable relative to each other.

The seat back 48 may define a midpoint M. The midpoint M of the seat back 48 is equidistant between a top T and a bottom B of the seat back 48. The top T and bottom B may be relative to the occupant of the seat 22f, 22r. The seat back 48 may be supported by the seat bottom 50 at the bottom B of the seat back 48. The headrest 52 may be supported at the top T of the seat back 48.

The seats 22f, 22r may be positioned to face each other. For example, one of the seats 22r may be rear-facing and another of the seats 22f may be front-facing, e.g., relative to the front and rear of the vehicle 24.

The housings 26 of the airbag assemblies 20, shown in FIGS. 1-6, may enclose and support components of the airbag assemblies 20, e.g., inflators 54, the airbags 28 in the uninflated position, etc. The housings 26 provide reaction surfaces for the airbags 28 in the inflated positions. The housings 26 may be supported by the roof 42 or other suitable component of the vehicle 24. The housings 26 may be formed of any material, e.g., a rigid polymer, a metal, a composite.

The housings 26 are positioned relative to the seats 22f, 22r. For example, one housing 26 may be supported in a seat-forward direction SD of one of the front facing seats 22f and another housing 26 may be positioned in a seat-forward direction SD of one of the rear facing seats 22r.

The airbag assemblies 20 include airbags 28, shown in FIGS. 1-7. The airbags 28 are inflatable from uninflated positions, shown in FIGS. 1 and 2, to inflated positions, shown in FIGS. 3-7. The airbags 28 may be formed of a woven polymer or any other material. As one example, the airbags 28 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Each airbag 28 in the inflated position has the first inflatable leg 30 and the second inflatable leg 32. Each inflatable leg 30, 32 may include an inner panel 56 and an outer panel 58, e.g., relative to a center C of the airbag 28 in the inflated position, shown in FIG. 7. The outer panel 58 may be spaced from the inner panel 56 along the lateral axis A2, e.g., defining an inflation chamber 60 therebetween. Each inflatable leg 30, 32 may include a front panel 62 and a rear panel 64, e.g., relative to the seat-forward direction SD of the seat 22f, 22r whose occupant is going to be restrained by the airbag 28. To put it another way, the front panel 62 may be farther from the seat back 48 than the rear panel 64. The front panel 62 and the rear panel 64 may extend from the inner panel 56 to the outer panel 58. The front panel 62 may be spaced from the rear panel 64 along the longitudinal axis A1, e.g., further defining the inflation chamber 60. Each inflatable leg 30, 32 may include a top panel 66 and a bottom panel 68, e.g., relative to the vertical axis A3. The top panel 66 and the bottom panel 68 may extend from the inner panel 56 to the outer panel 58. The top panel 66 may be spaced from the bottom panel 68 along the vertical axis A3, e.g., further defining the inflation chamber 60. One or more of the panels 62, 64, 66, 68 may be monolithic with each other, i.e., made of a single piece of material. One or more of the panels 62, 64, 66, 68 may be fixed to each other, e.g., via stitching, friction welding, adhesives, etc.

Figure 7:
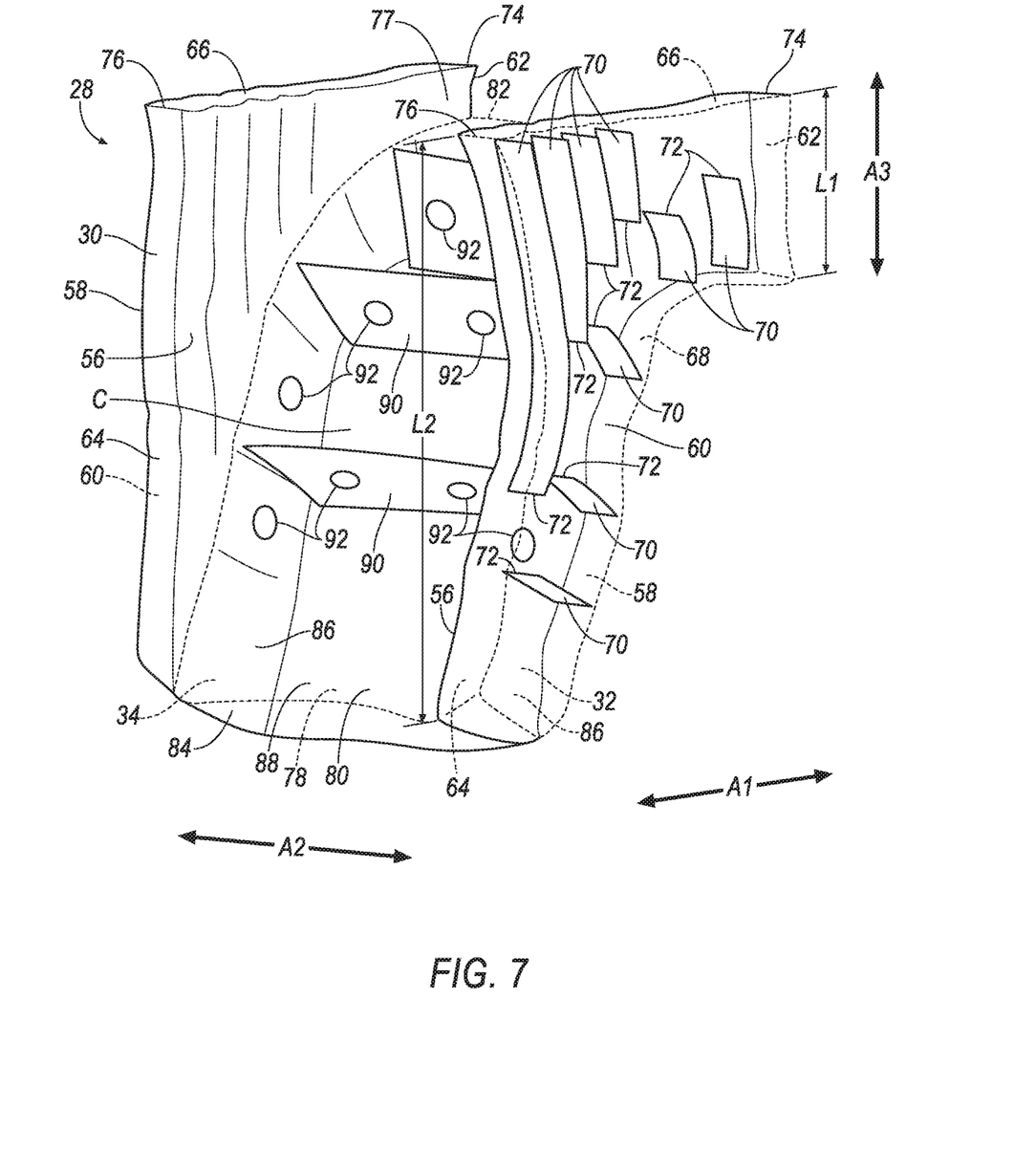
FIG. 7 is a perspective view of the airbag in the inflated position.

Each inflatable leg 30, 32 may include one or more internal panels 70 within the airbag 28, e.g., within the inflation chamber 60, as shown in FIG. 7. The internal panels 70 may extend from the inner panel 56 to the outer panel 58. The internal panels 70 may extend from the top panel 66 or the bottom panel 68 to distal edges 72. The distal edges 72 of the internal panels 70 may be spaced from each other and free of attachment to other panels, e.g., free from attachment to other internal panels 70, the inner panel 56, the outer panel 58, the front panel 62, the rear panel 64, etc. The internal panels 70 may control the flow of fluid to inflate the chamber 60, e.g., inflating areas between the internal panels 70 in a desired order, opening vents via fluid pressure, etc.

Each inflatable leg 30, 32 may have a first end 74 and a second end 76. The second end 76 may be spaced from the first end 74 along the longitudinal axis A1. The first end 74 may be in the seat-forward direction SD relative to the second end 76, e.g., relative to the seat 22f, 22r whose occupant is going to be restrained by the airbag 28. The first end 74 and the second end 76 may be distal of the airbag 28 in the inflated position.

Figure 4:
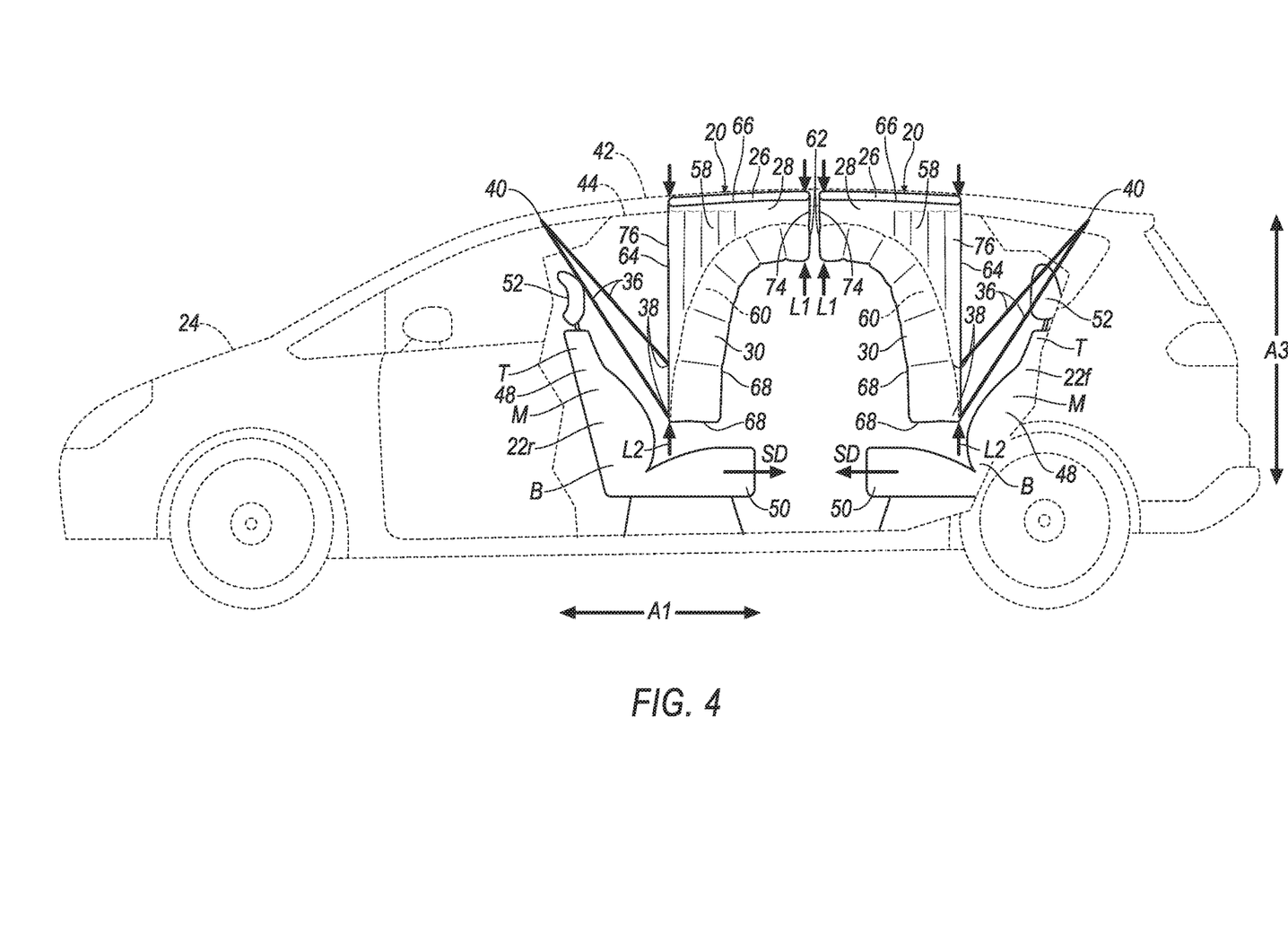
FIG. 4 is a side view in of the interior of the vehicle with the airbags of FIG. 3 in the inflated position.
Figure 6:
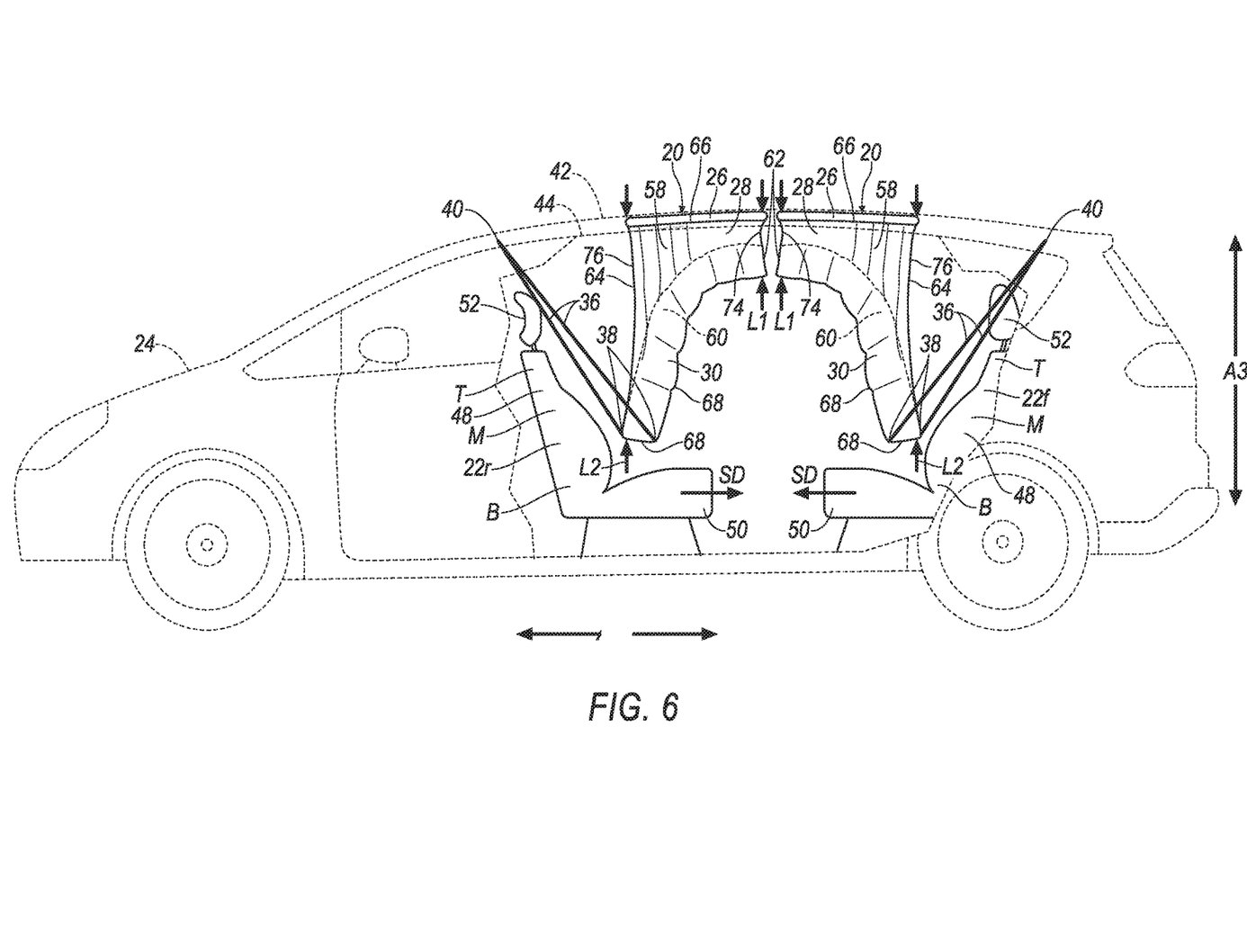
FIG. 6 is a side view in of the interior of the vehicle with the airbags of FIG. 5 in the inflated position.

Each inflatable leg 30, 32 may have a first length L1 at the first end 74, as shown in FIGS. 4 and 6. For example, the first length L1 may be between the top panel 66 and the bottom panel 68 at the front panel 62. Each inflatable leg 30, 32 may have a second length L2 at the second end 76. For example, the second length L2 may be between the top panel 66 and the bottom panel 68 at the rear panel 64. The second length L2 may be greater than the first length L1 when the airbag 28 is in the inflated position.

Each inflatable leg 30, 32 may extend from the housing 26. For example, the top panel 66 may be fixed to the housing 26. The front panel 62, the rear panel 64, the inner panel 56, and/or the outer panel 58 may extend away from the housing 26, e.g., to the bottom panel 68 and along the vertical axis A3.

Each inflatable leg 30, 32 may extend along the longitudinal axis A1 when the airbag 28 is in the inflated position. For example, the inner panel 56 and/or the outer panel 58 may extend along the longitudinal axis A1 between the front panel 62 and the rear panel 64.

Each inflatable leg 30, 32 may extend along the vertical axis A3 when the airbag 28 is in the inflated position. For example, the inner panel 56 and/or the outer panel 58 may extend along the vertical axis A3 between the top panel 66 and the bottom panel 68. Each inflatable leg 30, 32 may extend below the midpoint M of the seat back 48 when the airbag 28 is in the inflated position. For example, the midpoint M of the seat back 48 may be between the top panel 66 and the bottom panel 68 along the vertical axis A3. As another example, the bottom panel 68 may be between the midpoint M of the seat back 48 and the seat bottom 50 along the vertical axis A3.

The first inflatable leg 30 and the second inflatable leg 32 are spaced from each other along the lateral axis A2, e.g., with a gap 77 therebetween. For example, the inner panel 56 of the first inflatable leg 30 may be spaced from the inner panel 56 of the second inflatable leg 32 with the gap 77 between the inner panels 56 when the airbag 28 is in the inflated position.

The inflatable member 34 may include a front panel 78, a rear panel 80, a top panel 82, a bottom panel 84, and a pair of opposing side panels 86. The panels 78, 80, 82, 84, 86 define a chamber 88 therebetween. One or more of the panels 78, 80, 82, 84, 86 may be monolithic with each other, i.e., made of a single piece of material. One or more of the panels 78, 80, 82, 84, 86 may be fixed to each other, e.g., via stitching, friction welding, adhesives, etc. The front panel 78 may be spaced from the rear panel 80 along the longitudinal axis A1. The front panel 78 may be in the seat-forward direction SD relative to the rear panel 80, e.g., the rear panel 80 may be between the front panel 78 and the seat back 48 along the longitudinal axis A1. The rear panel 80 of the inflatable member 34 may be monolithic with the rear panel 64 of the inflatable legs 30, 32. The front panel 78 of the inflatable member 34 may be monolithic with the front panel 62 of the inflatable legs 30, 32. The side panels 86 may be spaced from each other along the lateral axis A2, e.g., with the top panel 82, the bottom panel 84, the front panel 78, and the rear panel 80 extending therebetween. The side panels 86 may extend along the vertical axis A3 and the longitudinal axis A1. The side panels 86 may be monolithic with the inner panels 56. The side panels 86 may be the inner panels 56.

The inflatable member 34 may include one or more internal panels 90. The internal panels 90 may be in the airbag 28, e.g., in the chamber 88 of the inflatable member 34. The internal panels 90 may extend between the side panels 86, the front panel 78, the rear panel 80, etc. The internal panels 90 may be spaced from each other, e.g., with the side panels 86, the front panel 78, the rear panel 80, etc., extending therebetween.

The chamber 88 of the inflatable member 34 may in fluid communication with the chambers 60 of the inflatable legs 30, 32. For example, the side panels 86, internal panels 90, inner panels 56, etc., may include one or more vents 92 that permit fluid to flow there through. The vents 92 be designed to permit fluid flow in two directions or in one direction.

The inflatable member 34 extends from the first inflatable leg 30 to the second inflatable leg 32, e.g., along the lateral axis A2. For example, the top panel 82, the bottom panel 84, the front panel 78, and/or the rear panel 80 of the inflatable member 34 may extend from the first inflatable leg 30 to the second inflatable leg 32. As another example, the inflatable member 34 may occupy the gap 77 between the first inflatable leg 30 and the second inflatable leg 32.

The inflatable member 34 may be elongated upward and away from the seat 22f, 22r when the airbag 28 is in the inflated position. For example, the bottom panel 84 may be closer to the seat back 48 along the longitudinal axis A1, and closer to the seat bottom 50 along the vertical axis A3, as compared to the top panel 82. To put it another way, the bottom panel 84 may be between the seat back 48 and the top panel 82 along the longitudinal axis A1, and between the seat bottom 50 and the top panel 82 along the vertical axis A3.

Figure 1:
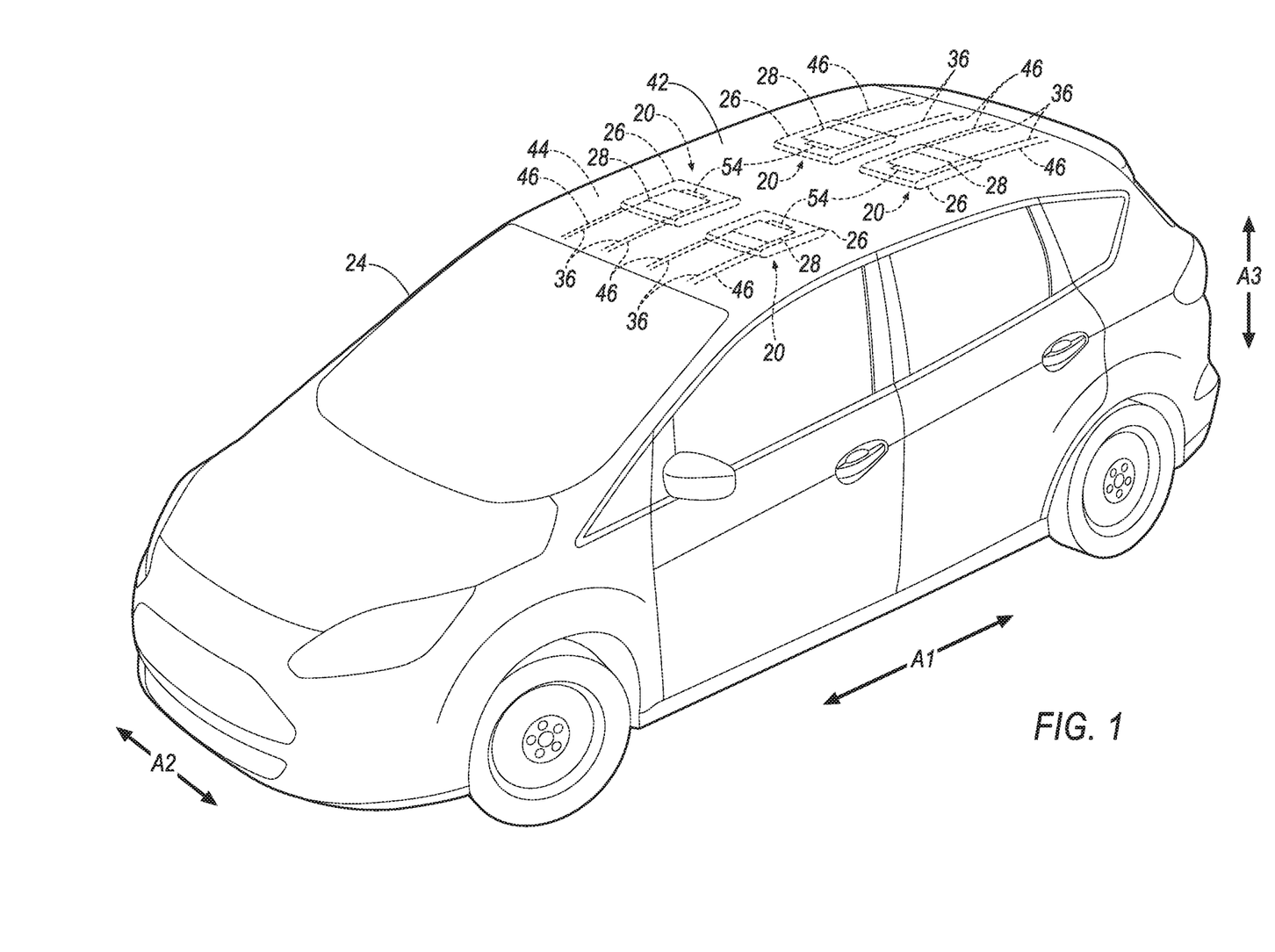
FIG. 1 is a perspective view of a vehicle including a plurality of airbag systems.
Figure 2:
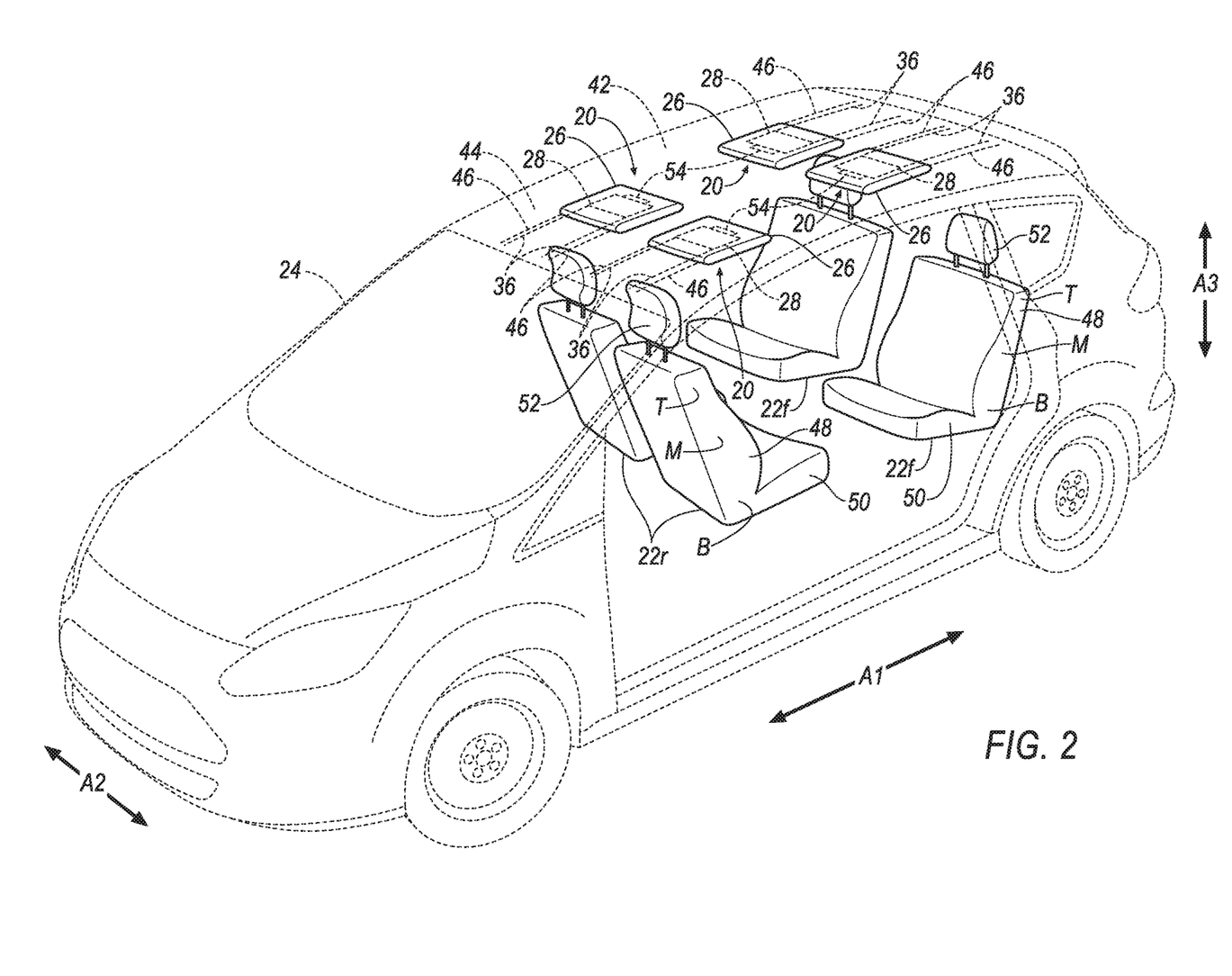
FIG. 2 is a perspective view of an interior of the vehicle with airbags of the airbag systems in uninflated positions.
Figure 3:
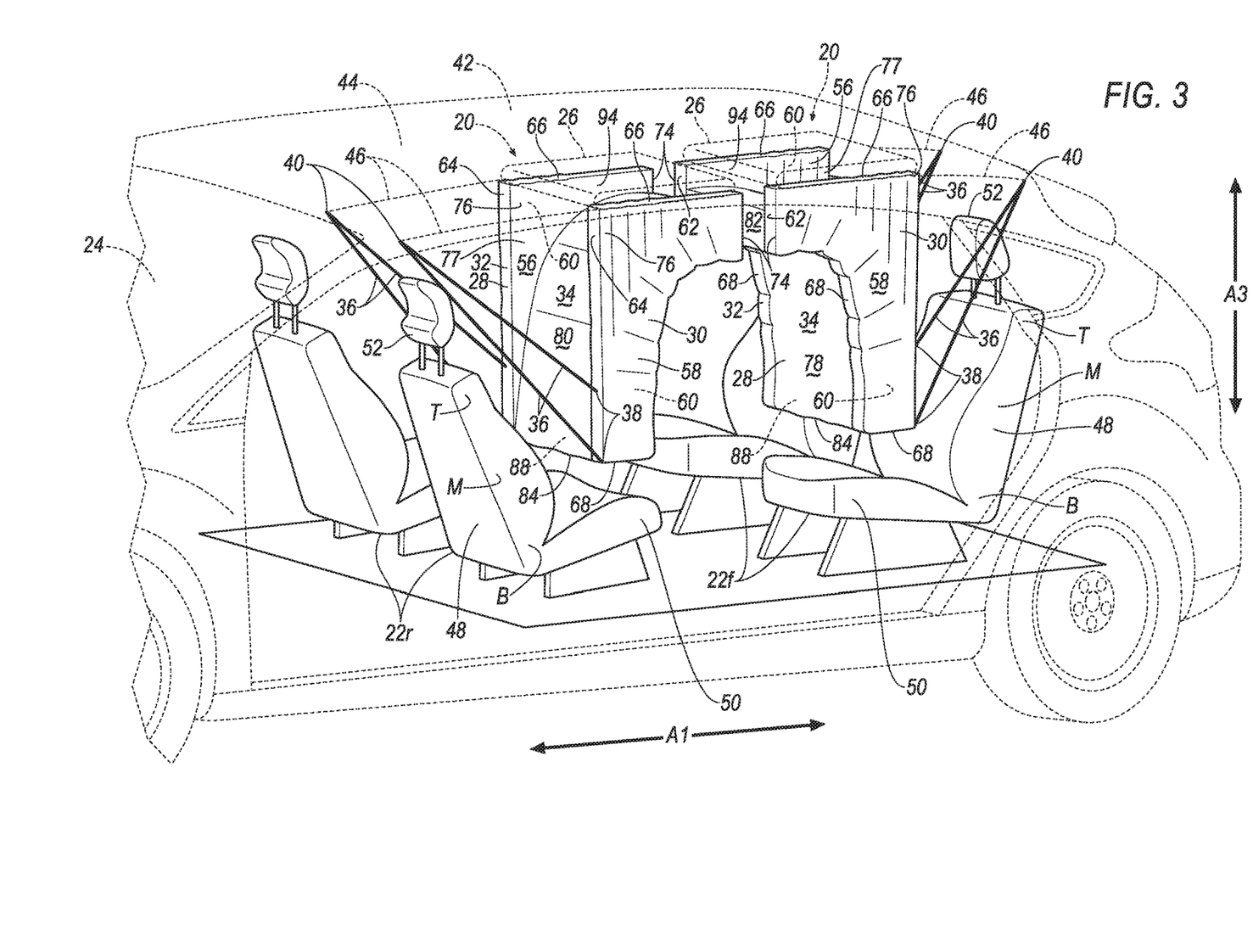
FIG. 3 is a perspective view of the interior of the vehicle with the airbags of the airbag systems in inflated positions.
Figure 5:
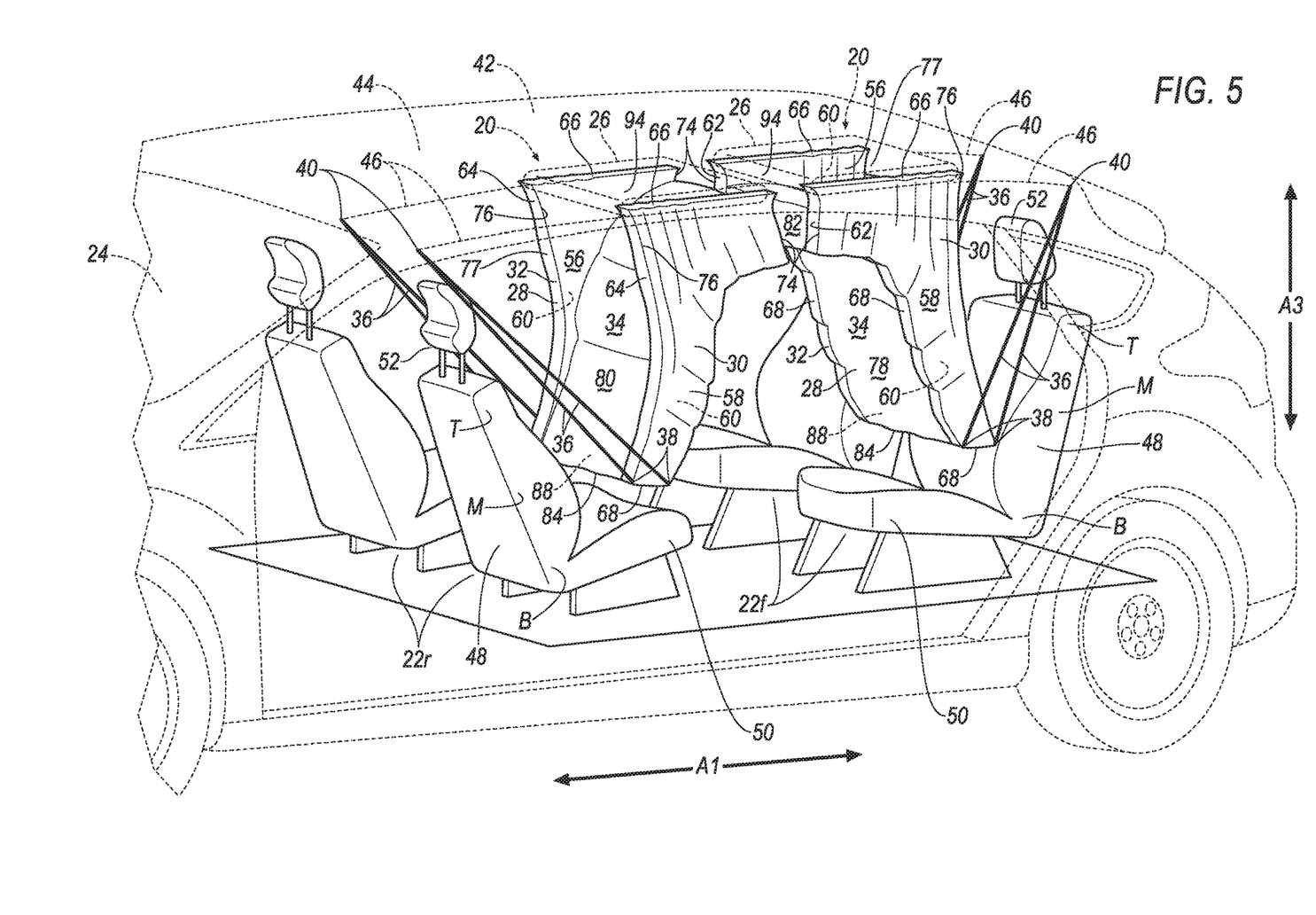
FIG. 5 is a perspective view of the interior of the vehicle with an alternate embodiment of the airbags of the airbag systems in inflated positions.

The inflatable member 34 may be spaced from the roof 42 when the airbag 28 is in the inflated position. For example, the top panel 82 and the front panel 78 may be spaced from the roof 42 and the housing 26, defining a gap 94 therebetween, as shown in FIGS. 3 and 5.

The inflatable member 34 may be arcuate when the airbag 28 is in the inflated position. For example, the rear panel 80 may be generally vertical at the bottom panel 84, e.g., relative to the vertical axis A3, and may curve as it extends to the top panel 82 where the rear panel 80 may be generally horizonal, e.g., relative to the longitudinal axis A1.

One or more tethers 36 may anchor each of the airbags 28 in the inflated positions, e.g., such that the airbag 28 may restrain movement of the occupant without support from an additional reaction surface such as a seat, an instrument panel, a door, a pillar, or other vehicle component behind the airbag 28. The tethers 36 may be fabric, or any other suitable material. The tethers 36 may be a same type of material as the airbag 28. The tethers 36 may be energy absorbing. For example, the tethers 36 may be an elastic material that stretches to absorb energy, e.g., applied to the airbag 28 by the occupant during an impact of the vehicle 24. As another example, each tether 36 may be folded and secured to itself with breakaway stitching, e.g., tension in the tether 36 applied by the occupant contacting the airbag 28 during an impact of the vehicle 24 may cause the breakaway stitching to tear to permit the tether 36 to unfold, absorbing energy applied to the tether 36.

Each tether 36 has the first end 38 fixed to the first inflatable leg 30 or the second inflatable leg 32 of one of the airbags 28. The tethers 36 may be fixed with stitching, friction welding, adhesives, etc. Each tether 36 has the second end 40 spaced from the first end 38 and the airbag 28. The second end 40 may be spaced from the first end 38, the housing 26, and/or the airbag 28 along the longitudinal axis A1. Each tether 36 may extend between the first end 38 and the second end 40 along the longitudinal axis A1 and adjacent the tear seams 46 when the airbag 28 is in the uninflated position. The second end 40 of the tether 36 may be behind the seat 22f, 22r, e.g., relative to the seat-forward direction SD. To put it another way, the seat back 48 may be between the first end 38 and the second end 40 of the tether 36 along the longitudinal axis A1. To put it another way, the second end 40 of the tether 36 may be vehicle forward of the rear facing seat 22r when the airbag 28 is positioned to protect an occupant of the rear facing seat 22r, and the second end 40 of the tether 36 may be vehicle rearward of the front facing seat 22f when the airbag 28 is positioned to protect an occupant of the front facing seat 22f. The second end 40 of the tether 36 may be fixed to the roof 42 or other suitable structure.

The first ends 38 of the tethers 36 may be spaced from each other. The first end 38 of one of the tethers 36 may be spaced from the first end 38 of another of the tethers 36 along the vertical axis A3. For example, the first ends 38 of the tethers 36 may be fixed to the rear panel 64, and/or the outer panel 58 of one of the inflatable legs 30, 32 and spaced from each other along the vertical axis A3 when the airbag 28 is in the inflated position, as shown in FIGS. 3 and 4. The first end 38 of one of the tethers 36 may be spaced from the first end 38 of another of the tethers 36 along the longitudinal axis A1. For example, the first ends 38 of the tethers 36 may be fixed to the bottom panel 68 and/or the outer panel 58 of one of the inflatable legs 30, 32 and spaced from each other along the longitudinal axis A1 when the airbag 28 is in the inflated position, as shown in FIGS. 5 and 6.

The second end 40 of one of the tethers 36 and the second end 40 of another of the tethers 36 may be fixed at a same location. For example, the second ends 40 of more than one of the tethers 36 may be fixed to the roof 42 behind the seat 22f, 22r, as shown in FIGS. 1-6.

The inflators 54 provide inflation medium to inflate the airbags 28 from the uninflated positions to the inflated positions. The inflators 54 may be in fluid communication with the inflatable legs 30, 32 and/or the inflatable members 34, e.g., directly, through various piping, etc. The inflators 54 may be, for example, pyrotechnic inflators that use a chemical reaction to drive inflation medium to the airbags 28. The inflators 54 may be of any suitable type, for example, cold-gas inflators. The inflators 54 may be supported by the housings 26, the roof 42, or by any other suitable location of the vehicle 24. One or more inflator 54 may be used to inflate each of the airbags 28.

Figure 8:
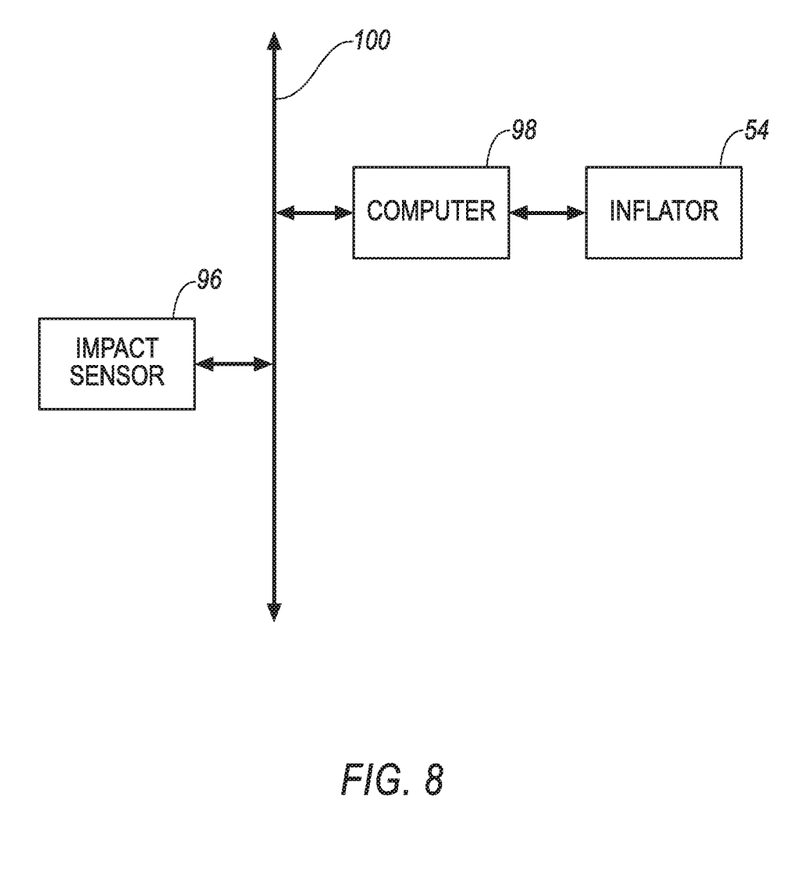
FIG. 8 is a schematic of components of the vehicle.

The vehicle 24 may include at least one impact sensor 96 for sensing impact of the vehicle 24, and a computer 98 in communication with the impact sensor 96 and the inflators 54, shown in FIG. 8. The computer 98 may activate one or more of the inflators 54, e.g., to provide an impulse to a pyrotechnic charge of the inflator 54 when the impact sensor 96 senses an impact of the vehicle 24. Alternatively or additionally to sensing impact, the impact sensor 96 may be configured to sense impact prior to impact, i.e., pre-impact sensing.

The impact sensor 96 may be in communication with the computer 98. The impact sensor 96 is configured to detect an impact to the vehicle 24. The impact sensor 96 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 96 may be located at numerous points in or on the vehicle 24.

The computer 98 and the impact sensor 96 may be connected to a communication bus 100, such as a controller area network (CAN) bus, of the vehicle 24. The computer 98 may use information from the communication bus 100 to control the activation of the inflator(s) 54. The inflator(s) 54 may be connected directly to the computer 98, as shown in FIG. 8, or the inflator(s) 54 may be connected via the communication bus 100.

The computer 98 may be a microprocessor-based computer implemented via circuits, chips, or other electronic components. For example, the computer 98 may include a processor, a memory, etc. The memory of the computer 98 may include memory for storing programming instructions executable by the processor as well as for electronically storing data and/or databases.

The computer 98 may store instructions executable by the processor to actuate one of the airbags 28, and/or to refrain from actuating another of the airbags 28 in response to detecting a vehicle impact. For example, upon detecting a rear vehicle impact the computer 98 may instruct one or more of the inflator(s) 54 to inflate the airbag 28 designed to restrain the occupant of one of the rear facing seats 22r, and refrain from transmitting an instruction to the inflator(s) 54 to inflate the airbag 28 designed to restrain the occupant of one of the front facing seats 22f. As another example, upon detecting a front vehicle impact the computer 98 may instruct one or more of the inflator(s) 54 to inflate the airbag 28 designed to restrain the occupant of one of the front facing seats 22f, and refrain from transmitting an instruction to the inflator(s) 54 to inflate the airbag 28 designed to restrain the occupant of one of the rear facing seats 22r.

In operation, the airbags 28 are in the uninflated position under normal operating conditions of the vehicle 24. In the event of an impact, the impact sensor 96 may detect the impact and transmit a signal through the communication bus 100 to the computer 98. The computer 98 may transmit a signal through the communication bus 100 to one or more of the inflators 54, e.g., based on a direction of the detected impact. Upon receiving the signal, the inflator(s) 54 may discharge and inflate the airbag(s) 28 with the inflation medium from the uninflated position to the inflated position.

During the impact, momentum of the occupant seated in one of the seats 22f, 22r may cause the occupant to move forward toward the airbag 28 in the inflated position. Such movement may be transferred to the airbag 28 and create tension in the tethers 36. The tethers 36 may maintain the airbag 28 in position to restrain the occupant from further movement.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat;
   a housing;
   an airbag inflatable to an inflated position and having a
     first inflatable leg and a second inflatable leg extending from the housing along a longitudinal axis, and an inflatable member extending from the first inflatable leg to the second inflatable leg along a lateral axis; and a tether having a first end fixed to the first inflatable leg and a second end spaced from the first end and the airbag.

2. The assembly of claim 1, wherein the inflatable member is elongated upward and away from the seat when the airbag is in the inflated position.

3. The assembly of claim 1, wherein the seat is rear-facing.

4. The assembly of claim 1, wherein the second end of the tether is behind the seat.

5. The assembly of claim 1, further comprising a vehicle roof, the housing supported by the roof, and the second end of the tether fixed to the vehicle roof.

6. The assembly of claim 1, further comprising a vehicle roof, the inflatable member spaced from the vehicle roof when the airbag is in the inflated position.

7. The assembly of claim 1, wherein the seat includes a seat back defining a midpoint, the first and second inflatable legs extending below the midpoint when the airbag is in the inflated position.

8. The assembly of claim 1, further comprising a processor and a memory storing instructions executable by the processor to actuate the airbag in response to detecting a vehicle rear impact.

9. The assembly of claim 1, further comprising:
a second seat, the seat and the second seat positioned to face each other;
a second housing;
a second airbag inflatable to an inflated position having a first inflatable leg and a second inflatable leg extending from the housing, and an inflatable member extending from the first inflatable leg to the inflatable second leg; and
a second tether having a first end fixed to the first inflatable leg of the second airbag and a second end spaced from the first end of the tether and the second airbag.

10. The assembly of claim 9, further comprising a processor and a memory storing instructions executable by the processor to actuate the airbag and to refrain from actuating the second airbag upon detecting a vehicle impact.

11. An assembly comprising:
a housing;
an airbag inflatable to an inflated position having a first inflatable leg and a second inflatable leg extending from the housing and along a longitudinal axis, and an inflatable member extending from the first inflatable leg to the second inflatable leg along a lateral axis; and
a tether having a first end fixed to the first inflatable leg and a second end spaced from the first end and the airbag.

12. The assembly of the claim 11, wherein the first inflatable leg has a first end and a second end spaced from the first end along the longitudinal axis, and a first length at the first end and a second length at the second end that is greater than the first length, when the airbag is in the inflated position.

13. The assembly of claim 11, further comprising a second tether external of the airbag and having a first end fixed to the first inflatable leg and a second end spaced from the first end and the airbag along the longitudinal axis.

14. The assembly of claim 13, wherein the first end of the tether is spaced from the first end of the second tether along a vertical axis.

15. The assembly of claim 13, wherein the first end of the tether is spaced from the first end of the second tether along the longitudinal axis.

16. The assembly of claim 13, wherein the second end of the tether and the second end of the second tether are fixed at a same location.

17. The assembly of claim 11, wherein the inflatable member is arcuate when the airbag is in the inflated position.

18. The assembly of claim 11, wherein the first inflatable leg includes an inner panel and an outer panel spaced from the inner panel along the lateral axis, and a plurality of panels extending from the inner panel to the outer panel within the airbag.

19. The assembly of claim 11, wherein the inflatable member includes a front panel and a rear panel spaced from the front panel along the longitudinal axis and a plurality of panels extending from the front panel to the rear panel within the airbag.

20. The assembly of claim 11, wherein the first inflatable leg includes a plurality of panels internal of the airbag and extending to distal edges, the distal edges spaced from each other and free of attachment to other panels.

* * * * *